Figure 1:
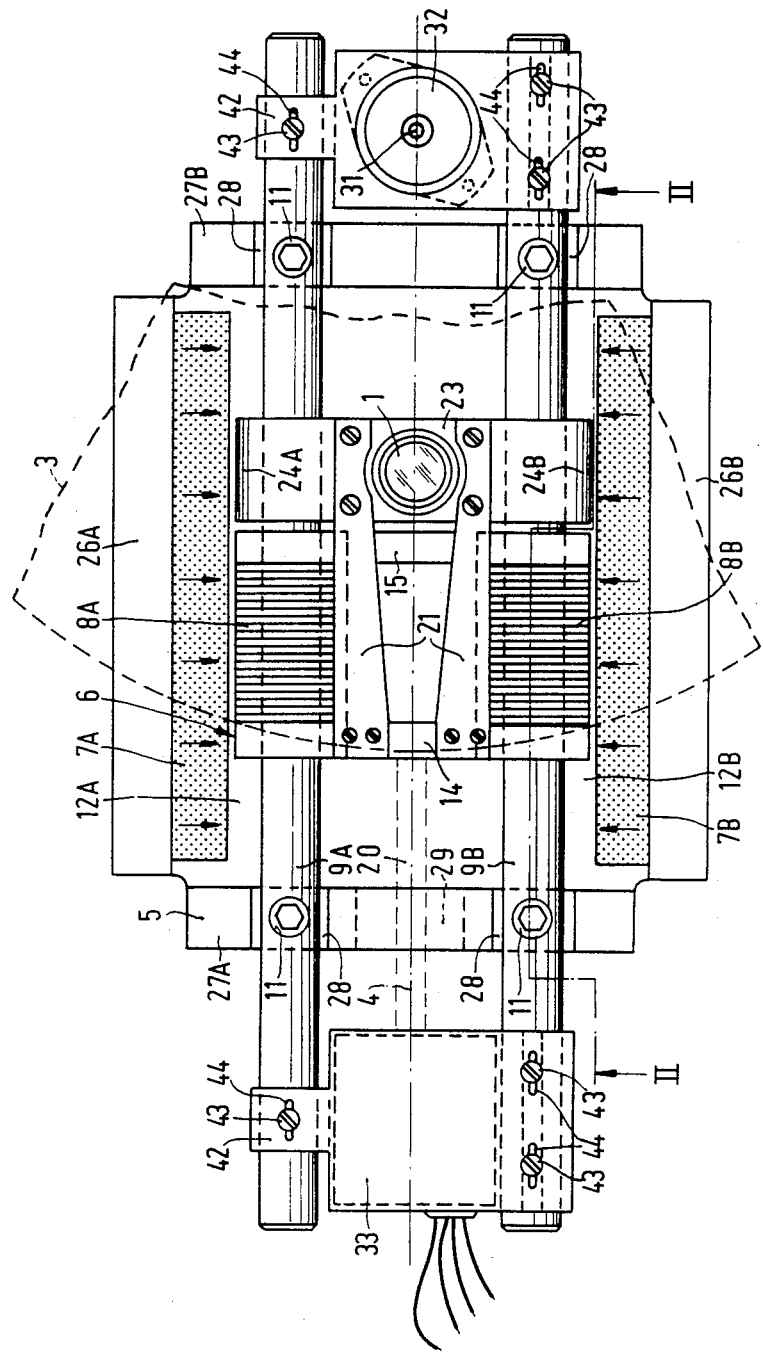

United States Patent [19]

Jansen et al.

[11] Patent Number: 4,545,046
[45] Date of Patent: Oct. 1, 1985

[54] OPTICAL RECORDING AND/OR READING DEVICE WITH SPINDLE AND OPTICAL ELEMENTS SUPPORTED ON PARALLEL BARS

[75] Inventors: Gerardus L. M. Jansen; Alexander Vorspaget, both of Eindhoven, Netherlands

[73] Assignee: U.S. Philips Corporation, New York, N.Y.

[21] Appl. No.: 471,971

[22] Filed: Mar. 4, 1983

[30] Foreign Application Priority Data

Jan. 14, 1983 [NL] Netherlands .................. 8300133

[51] Int. Cl.$^4$ .................. G11B 7/08; G11B 21/02
[52] U.S. Cl. .................. 369/111; 369/32; 369/33; 369/44
[58] Field of Search .................. 369/111, 32, 33, 44, 369/46, 249, 219, 220, 221, 223; 360/106

[56] References Cited

U.S. PATENT DOCUMENTS

| | | | |
|---|---|---|---|
| 3,657,707 | 4/1972 | McFarland et al. | 365/127 |
| 3,727,195 | 4/1973 | McLaughlin | 369/32 |
| 3,829,622 | 8/1974 | Elliot | 179/100.3 V |
| 3,992,576 | 11/1976 | Sugiura | 369/44 |
| 4,044,378 | 8/1977 | Laub | 369/111 |
| 4,381,556 | 4/1983 | Bourdon et al. | 369/44 |
| 4,423,449 | 12/1983 | Hasegawa | 360/106 |

FOREIGN PATENT DOCUMENTS

| | | |
|---|---|---|
| 2472298 | 6/1981 | France . |
| 2505074 | 11/1982 | France . |
| 113427 | 7/1982 | Japan . |

Primary Examiner—Raymond F. Cardillo, Jr.
Assistant Examiner—Alan K. Aldous
Attorney, Agent, or Firm—Robert S. Smith

[57] ABSTRACT

An apparatus reads and/or records information on a disc by means of a light beam, which disc rotates about an axis of rotation, and is driven by a drive spindle which is journalled in a spindle support, an objective 1 being moved along two parallel guides by means of a slide in a radial direction relative to the axis of rotation. All parts of an opto-electronic system for producing the light beam and for effecting a conversion between optical and electrical modulation may be arranged on the slide but may alternatively form part of a stationary opto-electronic system. At least the spindle support or the stationary opto-electronic system is supported by at least one of the guides, for example by means of supports and which are formed with locating stops which cooperate with the guides 9A and 9B.

2 Claims, 3 Drawing Figures

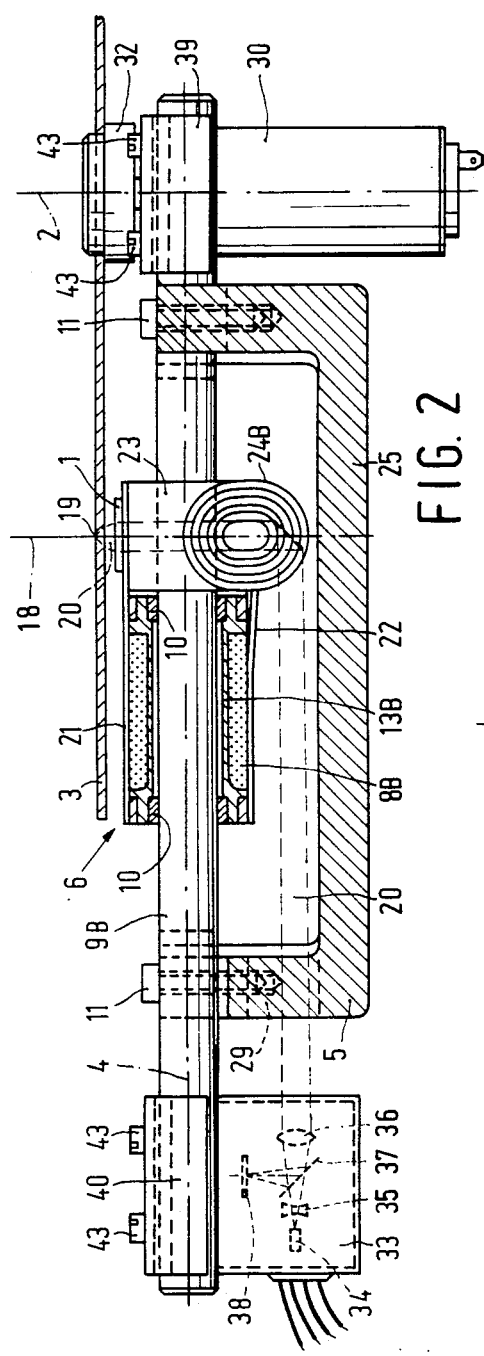
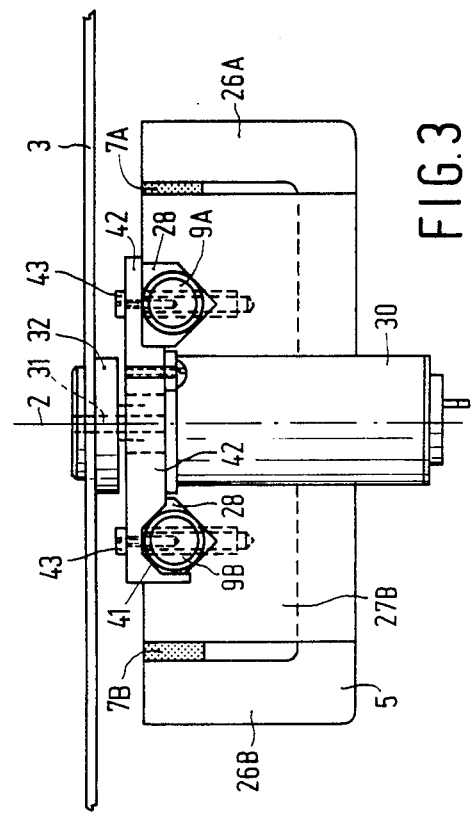

OPTICAL RECORDING AND/OR READING DEVICE WITH SPINDLE AND OPTICAL ELEMENTS SUPPORTED ON PARALLEL BARS

The invention relates to apparatus for recording and/or reading information on a disc by means of a radiation beam. The disc is rotatable about an axis of rotation and the apparatus comprises: a stationary frame; a drive means for the rotary drive of the disc. The drive means comprises a drive spindle which is rotatable about the axis of rotation and a stationary spindle support provided with bearing means for the drive spindle; a slide which is movable in a radial direction relative to said axis of rotation; a parallel guide arrangement for the slide, which arrangement comprises two parallel guides which are detachably secured to the frame at some distance from each other; and, possibly, a stationarily arranged optoelectronic system comprising a light source, one or more optical elements, and means for effecting a conversion between optical and electrical modulation of the information.

An apparatus of this type is known from the Applicant's previously filed but not yet published Netherlands patent application 8204981. The parallel guides in this apparatus comprise two ground rods of circular cross-section. The opto-electronic system is always present but need not always be arranged stationarily. Devices are known in which the opto-electronic system is combined to form a unit with the objective, see for example U.S. Pat. No. 4,135,083. This device may be referred to as an integrated optical pick-up, which pick-up is bodily movable for following the information tracks on the disc. Adding all the optical and electronic components in order to obtain an integrated pick-up has the result that the system which is movable relative to the disc has a larger mass than if the objective alone is movable and the opto-electronic system is arranged stationarily elsewhere on the slide or at another location. In the last-mentioned case the distance between the system and the objective is variable and it is difficult to ensure that the system cooperates correctly with the movable objective. For this purpose it is necessary that the components of the opto-electronic system are positioned and aligned in an accurate manner relative to the path of movement of the slide. The spindle support of the drive means should also be positioned accurately relative to the path of movement of the slide.

In the known device and in similar known devices the spindle support and the stationary opto-electronic system, if present, are aligned and positioned accurately by means of a base plate on which accurately machined locating surfaces are formed at a number of levels, to which surfaces the various parts of the device are secured. A very high accuracy is required because various manufacturing tolerances accumulate in the overall dimensional tolerance of the complete device. Moreover, the attainable accuracy greatly depends on the temperature of the base plate and the parts secured to this plate.

It is the object of the invention to provide an apparatus of the type mentioned in the opening paragraph in which the spindle support and/or a stationarily arranged opto-electronic system, if present, can be positioned accurately relative to the path of movement of the slide in a simple and cheap manner and in which effects of temperature variations on the positioning accuracy is minimal. To this end the invention is characterized in that at least one of the parts of the apparatus, namely the spindle support and the opto-electronic system, if present, is supported by the two parallel guides and each of said parts if supported by the parallel guides, is provided with locating stops which cooperate with the guides for an accurate positioning.

In the apparatus in accordance with the invention the guides provided for guiding the slide are also employed for supporting the spindle support and/or the stationary opto-electronic system, so that no specially machined mounting surfaces have to be formed on a base plate for these parts. As temperature variations mainly give rise to variations of the longitudinal dimensions of the guides, which variation do not affect the correct operation of the apparatus, the operation of the apparatus is highly independent of temperature effects. In the same way as in the aforementioned known device the two parallel guides may comprise ground rods of circular cross-section which is advantageous because, as is known, such rods are among the cheapest precision parts available.

An embodiment of the invention will now be described in more detail, by way of example, with reference to the drawing, in which:

FIG. 1 is a plan view of an apparatus in accordance with the invention, in which the parallel guides carry both a spindle support and a stationary opto-electronic system, FIG. 2 is a view taken on the lines II—II in FIG. 1 and FIG. 3 is a right-hand side view of the apparatus of FIG. 1.

The apparatus shown serves for translating an objective 1 along a radial path 4 relative to a disc 3 which rotates about an axis of rotation 2. The apparatus comprises a frame 5 and a slide 6 which carries the objective 1 and which can be translated relative to said frame along the radial path 4. The frame carries two permanent stator magnets 7A and 7B, which extend parallel to the path 4 and which are magnetized transversely of said path, the directions of magnetization being indicated by arrows in FIG. 1. Two translatable drive coils 8A and 8B of an electrically conductive material are movable in the magnetic field of these stator magnets.

The parallel guide arrangement for the slide 6 comprises two parallel guides in the form of two rods 9A and 9B and four sleeve bearings 10 made of tetrafluoroethylene. The rods are secured to the frame 5 by means of bolts 11. They form part of a stator yoke with air gaps 12A and 12B respectively. The drive coils 8A and 8B are arranged concentrically around the rods 9A and 9B.

The drive coils 8A and 8B are arranged on cylindrical coil formers 13A and 13B. The coil formers are internally provided with said sleeve bearings on both ends. They form a structural part of the slide. In addition to the coil formers the slide comprises two end plates 14 and 15. These plates serve for interconnecting the two coils 8A and 8B and are preferably made of a none-magnetizable light-weight but strong material, such as a plastic or aluminium.

For following the movements of the disc 3 by means of the read spot 19 formed by a radiation beam 20 emitted by a radiation source the objective 1 is movable along its optical axis 18 under servo control. The objective is arranged on the slide 6 via two plate springs 21 as the top and two plate springs 22 at the bottom. The objective is mounted on a bracket 22 which is movable along the optical axis 18 over a limited distance and which carries actuator coils 24A and 24B on each end. These coils serve for the electro-dynamic drive of the objective along the optical axis. The upper parts of the actuator coils are movable in air gaps 12A and 12B respectively between the rods 9A and 9B and the stator magnets 7A and 7B, so that the actuator coils cooperate with the field of the stator magnets to exert forces on the objective along its optical axis. Thus, the stator magnets are used both for driving the slide along the axis 4 and for driving the objective along the axis 18.

The frame 5 is made of a magnetizable material, for example iron, and forms part of the stator yoke which carries the permanent magnets 7A and 7B and of which the rods 9A and 9B also form part, as already stated.

The apparatus is constructed symmetrically relative to a plane containing the axes 4 and 18. The rods 9A and 9B are identical and the same applies to the drive coils 8A and 8B, the actuator coils 24A and 24B, and the stator magnets 7A and 7B.

A frame 5 is shaped substantially as an open box having a bottom 25 and upright walls 26A, 26B, 27A and 27B. At the corners these walls are not interconnected. The complete frame is blanked from sheet iron, the walls being formed by portions which are bent-over relative to the base plate. The stator magnets 7A and 7B are secured to the inner side of the walls 26A and 26B, for example by a suitable glue. The magnetic lines of force of the magnets extend from the magnets 8A and 8B through the air gaps 12A and 12B to the rods 9A and 9B, which are each supported by portions of the walls 27A and 27B. Thus, they are in contact with the sheet iron frame 5, so that the magnetic circuit is closed through the frame.

In order to guarantee that the rods 9A and 9B extend perfectly parallel and at the same level recesses 28 with a V-shaped bottom are formed in the walls 27A and 27B. These recesses can simply be formed with the required accuracy by a machining operation. No stringent requirements are imposed on the accuracies of the parts of the frame 5. The accuracy of the guide arrangement of the slide 6 depends on the accuracy of the shape and dimensions of the rods 9A and 9B and the accuracy with which they extend parallel to each other and are supported at the same level by the frame.

In the wall 27A an aperture 29 is formed which inter alia serves for the passage of the radiation beam 20. At the underside the objective 1 carries a reflecting element 30 which reflects the radiation beam through an angle of 90°. The aperture 29 may also serve for the passage of electrical connecting wires to the coils 8A and 8B on the slide and the actuator coils 24A and 24B. Such connecting wires and other electrical connections to the slide are not shown for simplicity and are irrelevant to the present invention. The means which are generally required for detecting the position of the objective 1 in the path 4 are not shown and are also irrelevant.

The apparatus comprises a drive means in the form of an electric motor 30 for the rotary drive of the disc 3. The motor comprises a drive spindle 31 which is rotatable about the axis of rotation 2 and which is journalled in the motor housing so that the motor housing serves as the stationary spindle support. The disc 3 may not be driven directly by an electric motor but by a pulley mounted on the spindle, which pulley is driven via a belt by an electric motor which is arranged at a different location. In that case a separate spindle support must be provided. A turntable 32 for supporting the disc 3 is mounted on the spindle 31.

The light beam 20 issues from a stationarily arranged opto-electronic system 33. This unit is schematically shown in FIGS. 1 and 2 and may be constructed in various manners. It may comprise a light source 34, for example a semiconductor diode, a diverging lens 35, a converging lens 36, a semitransparent mirror 37, and a system of light-sensitive semiconductor diodes 38 for converting the light-beam modulation into an electrical modulation. The apparatus shown is suitable only for reading optical discs, not for recording information. In apparatus suitable for recording information the emergent light beam should be modulated with information. This may for example be achieved by modulating the intensity of the light beam emitted by the laser with the information. For the construction and operation of opto-electronic devices suitable for converting optical into electrical modulation and vice versa reference is made to the comprehensive literature available on this subject. For the invention it is only important that the opto-electronic device is arranged stationarily and is mounted independently of the movable slide 6. The information to be recorded or read is transferred between the slide 6 and the stationary system 33 without contact via the light beam 20. It is essential that the position of the stationary opto-electronic system is defined accurately relative to the slide 6 in any position of the slide 6 along its path 4.

Both the electric motor 30 and the opto-electronic system 33 are supported by the two parallel rods 9A and 9B. For this purpose the motor 30 is arranged on a support 39 and the system 33 is arranged in a support 40. The support 39 forms part of the spindle support for supporting the spindle 31 and the support 40 forms part of the system 33. The two supports are formed with a V-shaped groove 41 on one side and a flat projection 42 on the other side. The walls of the V-shaped grooves 41 and the bottoms of the flat projections 42 constitute locating stops, which cooperate with the guides 9A and 9B for positioning the supports 39 and 40 accurately relative to the rods. Small deviations from the desired position in the longitudinal direction of the rods have hardly or no effect on the correct operation of the apparatus. Consequently, a very accurate adjustment in the longitudinal direction of the guide rods 9A and 9B is not necessary. Temperature variations hardly effect the correct operation of the apparatus, because the position of the slide and the two supports 39 and 40 relative to each other mainly varies in the longitudinal direction of the guide rods 9A and 9B. The supports 39 and 40 are secured to the rods 9A and 9B by means of bolts 43, which are passed through slots 44.

Alternatives to the embodiment of the invention shown in the drawing are possible. For example, it is not necessary that the guides comprise rods of circular cross-section. Guides of different cross-section may also be used in principle. Moreover, it is not necessary to make the frame 5 of a ferro-magnetic material and to employ it as a part of the stator yoke. It is not necessary to secure the spindle support as well as the opto-electronic system to the guides. Some of the advantages of the invention are already obtained if only one of these parts is arranged on the guides. Alternatively, the locating stops of the supports may comprise the ends of set-screws by means of which the desired positional accuracy can be adjusted.

What is claimed is:

1. Apparatus for recording and/or reading information on a disc by means of a radiation beam, which disc is rotatable about an axis of rotation, which apparatus comprises:
   a stationary frame,
   a drive means for the rotary drive of the disc, which drive means comprises a drive spindle which is rotatable about said axis of rotation and a stationary spindle support system provided with bearing means for the drive spindle,
   a slide which is movable in a radial direction relative to said axis of rotation,
   a parallel-guide arrangement for the slide, which arrangement comprises two parallel guides which are detachably secured to the frame at some distance from each other and,
   an opto-electronic system stationarily arranged with respect to said parallel guides comprising a light source, one or more optical elements, and means for effecting a conversion between optical and electrical modulation of the information,
   at least one of said systems being supported by the two parallel guides, and being provided with locating stops which cooperate with the guides for an accurate positioning.

2. Apparatus for recording and/or reading information on a disc by means of a radiation beam, which disc is rotatable about an axis of rotation, which apparatus comprises:
   a stationary frame,
   a drive means for the rotary drive of the disc, which drive means comprises a drive spindle which is rotatable about said axis of rotation and a stationary spindle support provided with bearing means for the drive spindle,
   a slide which is movable in a radial direction relative to said axis of rotation,
   a parallel-guide arrangement for the slide, which arrangement comprises two parallel guides which are detachably secured to the frame at some distance from each other and,
   one or more optical elements which are stationarily arranged with respect to the parallel-guide arrangement, and means for effecting a conversion between optical and electrical modulation of the information,
   the spindle support being supported by the two parallel guides, and
   the spindle support being provided with locating stops which cooperate with the guides for an accurate positioning.

* * * * *